(12) United States Patent
Liu et al.

(10) Patent No.: US 6,298,450 B1
(45) Date of Patent: Oct. 2, 2001

(54) DETECTING STATES OF SIGNALS

(75) Inventors: Jonathan H. Liu, Folsom; Michael J. Allen, Rescue, both of CA (US); James W. Conary, Aloha; David P. DiMarco, Hillsboro, both of OR (US); Jeffrey L. Miller, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/421,030

(22) Filed: Oct. 20, 1999

Related U.S. Application Data

(62) Division of application No. 09/002,019, filed on Dec. 31, 1997, now Pat. No. 6,175,928.

(51) Int. Cl.[7] .................................................. H03K 23/00
(52) U.S. Cl. .............................. 713/502; 327/1; 713/401
(58) Field of Search ..................................... 713/502, 401; 702/182, 189; 714/49; 377/27, 39; 327/1, 18, 20, 47–49

(56) References Cited

U.S. PATENT DOCUMENTS

| | | | |
|---|---|---|---|
| 4,572,661 | * 2/1986 | King | 399/29 |
| 5,498,977 | 3/1996 | Pickup | 326/31 |
| 5,563,928 | 10/1996 | Rostoker et al. | 377/20 |
| 5,726,567 | 3/1998 | Lewis et al. | 324/207.16 |
| 5,771,267 | * 6/1998 | Graef et al. | 377/16 |
| 5,826,135 | * 10/1998 | Lee | 399/43 |
| 5,886,583 | 3/1999 | Horiuchi | 331/11 |
| 5,893,044 | 4/1999 | King et al. | 701/214 |
| 5,940,027 | 8/1999 | Forseth et al. | 342/357.06 |

* cited by examiner

Primary Examiner—Thomas M. Heckler
(74) Attorney, Agent, or Firm—Trop, Pruner & Hu, P.C.

(57) ABSTRACT

A time delay from a triggering event to switching of an output signal in a microelectronic device can be adjusted to compensate for various characteristics of the electronic device. The characteristics include temperature, voltage, and manufacturing process conditions. The time delay is adjusted using a variable delay circuit having multiple delay cells that are selectively coupled to control the time delay. The conditions of the electronic device are detected using a process sensor, which includes an oscillator having a frequency that is sensitive to variations in the conditions.

28 Claims, 10 Drawing Sheets

DETECTING STATES OF SIGNALS

This is a divisional of U.S. patent application Ser. No. 09/002,019, filed Dec. 31, 1997 now U.S. Pat. No. 6,175,928.

BACKGROUND

The invention relates to detecting states of signals.

Electronic devices generate signal outputs that are typically triggered off a triggering event, e.g., an edge of a clock. Several factors can affect the time delay between the triggering event and the generation of the desired output. Such factors include temperature, voltage, and manufacturing process variations. Signal drivers generally operate faster at higher voltages and lower temperatures, and are generally slower at lower voltages and higher temperatures. Variations in the manufacturing process of these electronic devices, such as shifts in threshold voltages of transistors and other process conditions, can also affect the switching speeds of the transistors. Such variations in voltages, temperatures, and process can result in large variances in the device output behavior.

For example, in clocked integrated circuit (IC) devices such as microprocessors, microcontrollers, and synchronous memories, one signal timing parameter is Tco (clock to output valid), which specifies the delay from the leading edge of a clock to when the output buffers of the clocked device switch. The Tco parameter is specified in terms of Tco_min and Tco_max, with Tco_min specifying the fastest time from clock to output valid and Tco_max indicating the slowest time from clock to output valid.

The variance in the delay time is caused by 1) the difference in flight time through circuitry in the IC device from the triggering event to the output between fast and slow conditions because circuitry tends to respond quicker in fast conditions; and 2) the difference in driver strength between fast and slow conditions (the driver output slew rate is smaller under fast conditions).

SUMMARY

The invention in one aspect is generally directed to reducing the variance in time delay between a triggering event and a desired output of an electronic device under different conditions. In another aspect, the invention is generally directed to sensing characteristics of the device using an oscillator having a frequency that is sensitive to the device characteristics.

In one aspect, the invention features an electronic device generating an output signal that changes state. The device includes a sensor to detect a characteristic of the device and a timing controller responsive to the sensor and a triggering event to control when the output signal changes state. The timing controller is configured to adjust a time delay between the triggering event and when the output signal switches state based on the characteristic detected by the sensor.

In another aspect, the invention features a method of controlling a time delay between a triggering event and switching of an output of a device. The method includes sensing a characteristic of the device. The time delay is adjusted based on the sensed characteristic.

In another aspect, the invention features a sensor for use in an electronic device. The sensor includes an oscillator having a frequency dependent upon a characteristic of the device and a count circuit responsive to the oscillator frequency to provide a value representing the characteristic of the device.

In another aspect, the invention features a circuit for determining if more than a predetermined number of data output bits are switching. The circuit includes a sensor receiving the data output bits, each data output bit capable of being at the first state or a second state. The sensor has a state that is controlled by the data output bits being at the first and second states. A comparator is configured to detect a sensor state corresponding to more than the predetermined number of the data output bits being at the first state and to output an indication that more than the predetermined number of data output bits are switching.

Other features and advantages will become apparent from the features and from the claims.

DETAILED DESCRIPTION

In the following description, a signal name followed by the symbol "#" indicates an active low signal.

Figure 1A:
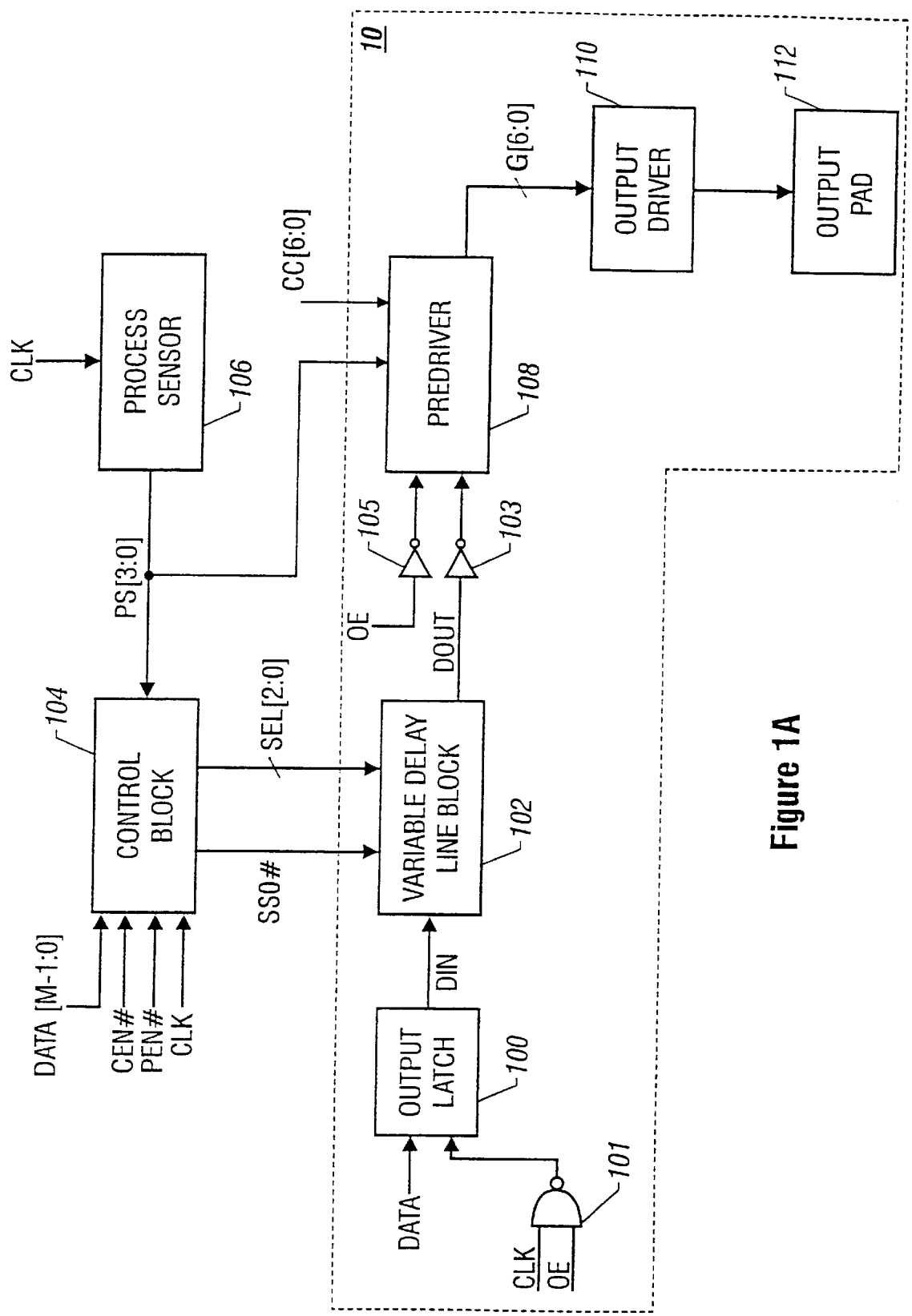
FIG. 1A is a block diagram of a signal output circuit.

Referring to FIG. 1A, signal output circuitry 10 for use in an electronic device, e.g., a microprocessor, microcontroller, and synchronous memory devices, includes a variable delay line circuit 102 that reduces the timing variance due to different device characteristics (e.g., temperature, voltage, and device process parameters) between a triggering event, e.g., the leading edge of a clock signal CLK, and the time when an output signal appears at an output pad 112. In one embodiment (illustrated in FIGS. 2A and 2B), the variable delay line circuit 102 includes multiple delay cells that can be selectively turned on or off.

Figure 1B:
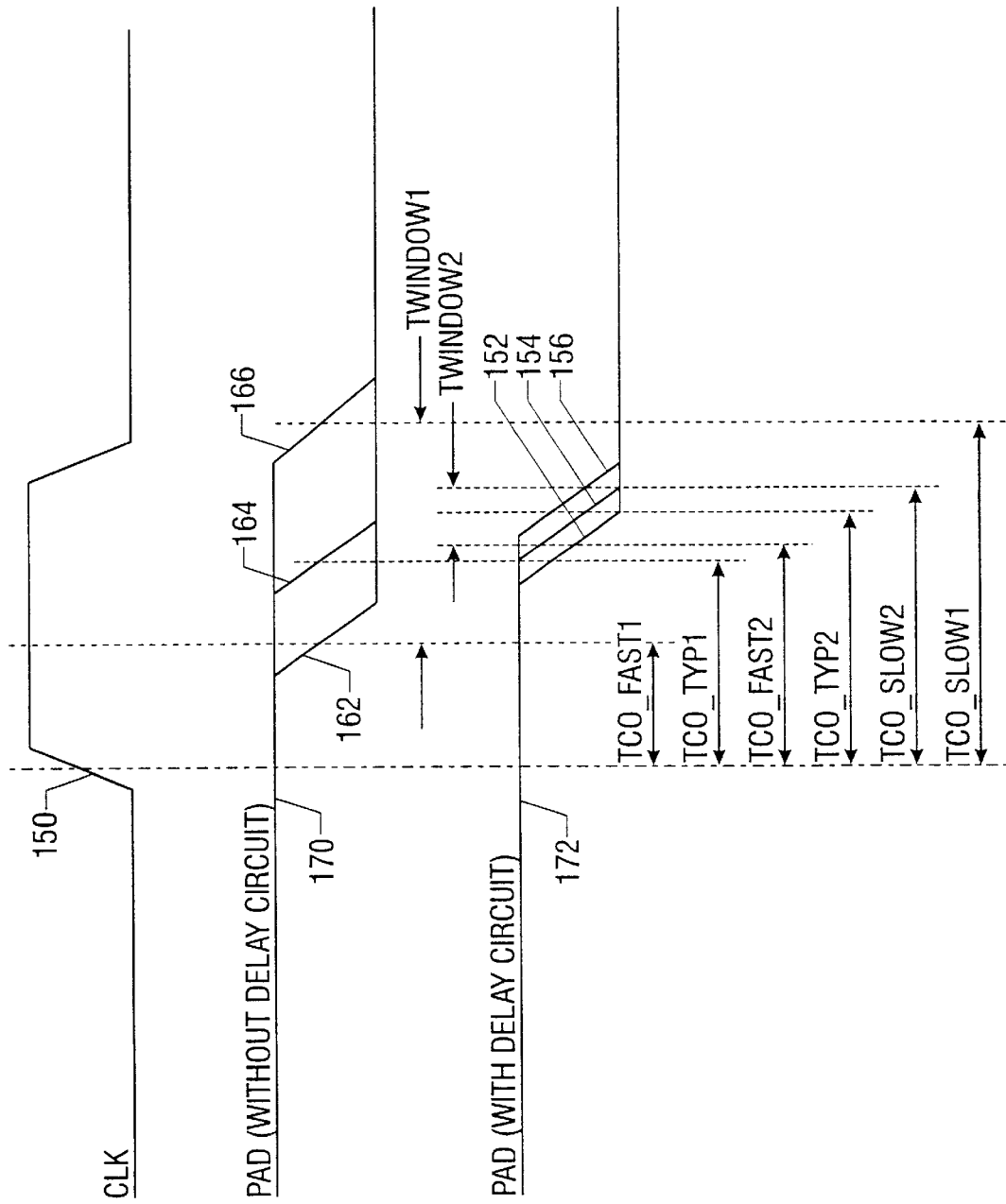
FIG. 1B is a timing diagram of signals associated with the signal output circuit of FIG. 1A.

Referring also to FIG. 1B, a timing diagram illustrates the different time delays from an edge 150 of CLK to the output pad 112 switching under three different device characteristics. The switching behavior of the output pad 112 is illustrated with the variable delay line circuit 102 in the signal output circuitry 10 enabled (graph 172) and with the variable delay line circuit 102 disabled (graph 170). The three different device characteristics include the following: fast (high voltage, low temperature, and fast process device parameters); typical (intermediate voltage and temperature and typical process parameters); and slow (low voltage, high temperature, and slow process parameters).

With the delay line circuit 102 disabled in the signal output circuitry 10 (graph 170), the output pad 112 switches (edge 162) after a time period Tco_fast1 from the clock edge 150 with fast device characteristics. Similarly, the output pad 112 switches (edge 164) after a time period Tco_typ1 from the clock edge 150 with typical device characteristics, and the output pad switches (edge 166) after a time period Tco_slow1 from the clock edge 150 with slow device characteristics. The time window in which the output pad 112 can switch to a valid state under the different device characteristics has a duration of Twindow1, which can be relatively large without compensation by the variable delay line circuit 102.

With the delay line circuit 102 enabled (graph 172), the output pad 112 switches (edge 152) after a time period Tco_fast2 from the clock edge 150. Similarly, the output pad 112 switches (edge 154) after a time period Tco_typ2 from the clock edge 150 with typical device characteristics, and the output pad switches (edge 156) after a time period Tco_slow2 from the clock edge 150 with slow device characteristics. Using the programmable delay line circuit 102 to adjust the delay from the clock edge 150 to output pad 112 switching, the variance between Tco_fast2 and Tco_slow2 under different device characteristics is reduced. As a result, the time window (represented as Twindow2 in FIG. 1B) in which the data output of the device switches to a valid state from the clock edge 150 is reduced.

In an alternative embodiment, rather than using a delay line circuit having delay cells, the drive strength of circuits in the data output path of the device can be varied to adjust the output speed. One way of controlling drive strength is to vary the effective size of transistors in the circuits, such as by turning on more drive transistors to increase switching speed and turning off drive transistors to decrease switching speed. For example, in one embodiment, the programmable transistors can be included in the output latch 100. Alternatively, the programmable transistors can be placed in buffers located between the output latch 100 and the predriver 108. In the alternative embodiment, the programmable transistors can be considered the variable delay line circuit 102.

By reducing such timing variance, the electronic device can be run at higher frequencies since the time window in which a device output can switch is reduced; as a result, other devices connected to the electronic device can better anticipate when the output is valid. In addition, in a multi-device system in which multiple devices are connected to a common bus, the risk of contention between outputs of devices is reduced because of the more predictable behavior of such device outputs.

In typical operation of the output circuitry 10, output data (DATA) is provided to an output latch 100 that latches the state of DATA for a predetermined amount of time, e.g., one CLK cycle. The output latch 100 latches the state of DATA when both an output enable signal OE and the clock CLK are active high, as detected by a NAND gate 101. The output latch 100 drives the state of DATA to the input of the variable delay line circuit 102, which provides a programmable delay between its input and its output, with the delay selected by bits SEL[2:0] from a control block 104.

The control block 104 receives input signals from a process sensor 106, which generates an output value PS[3:0] based on the temperature, voltage, and process parameters of the electronic device. The process sensor 106 is described in connection with FIG. 5. The bits PS[3:0] are received by the control block, and the control block 104 converts PS[3:0] to the 3-bit signal SEL[2:0], which has eight possible values, if an enable signal PEN# is active low. The bits SEL[2:0] at binary value 000 indicate a slow condition in the electronic device, while a binary value 111 represents a fast condition. A binary value of 100 on SEL[2:0] represents a typical condition. If the control block 104 can be set to output the typical binary value 100 on SEL[2:0].

The control block also outputs a signal SSO#, which is provided to the variable delay line circuit 102 when the control block detects greater than a certain number of data bits DATA[M−1:0] switching at the same time. SSO# when activated low decreases the delay through the circuit 102 to compensate for power supply voltage (VCC and VSS) noise so that the time delay from a CLK edge to valid data output is not increased.

Although signals SEL[2:0] and PS[3:0] are described with specific numbers of bits and values, other configurations are possible, with larger numbers of bits providing more information and greater flexibility and lower numbers of bits reducing circuit overhead.

The output from the variable delay line circuit 102 is provided to an input of a predriver 108 through an inverter 103. The predriver 108 also receives the inverted state of the output enable signal OE through an inverter 105, as well as bits PS[3:0] from the process sensor 106. The signal OE enables the predriver 108 to generate gate select signals G[6:0], based on output current control input signals CC[6:0] received by the predriver 108. The signals G[6:0] are provided to an output driver 110 that drives the output pad 112. The output driver has multiple transistors selectively turned on by the bits GE[6:0] to control the output swing levels (high and low amplitude) at the output pad 112.

The PS[3:0] input to the predriver 108 controls the slew rates of the predriver output G[6:0]. The slew rates of the predriver output G[6:0] in turn control the output slew rate of the output driver 110. For example, in the slow condition (PS[3:0] is 0000), all transistors in the predriver 108 are turned on to increase the slew rate of G[6:0]. However, in the fast condition (PS[3:0] is 1111), most of the transistors in the predriver 108 are off to decrease the slew rate of G[6:0]. Intermediate values of PS[3:0] vary the slew rate of G[6:0] further.

Figure 7:
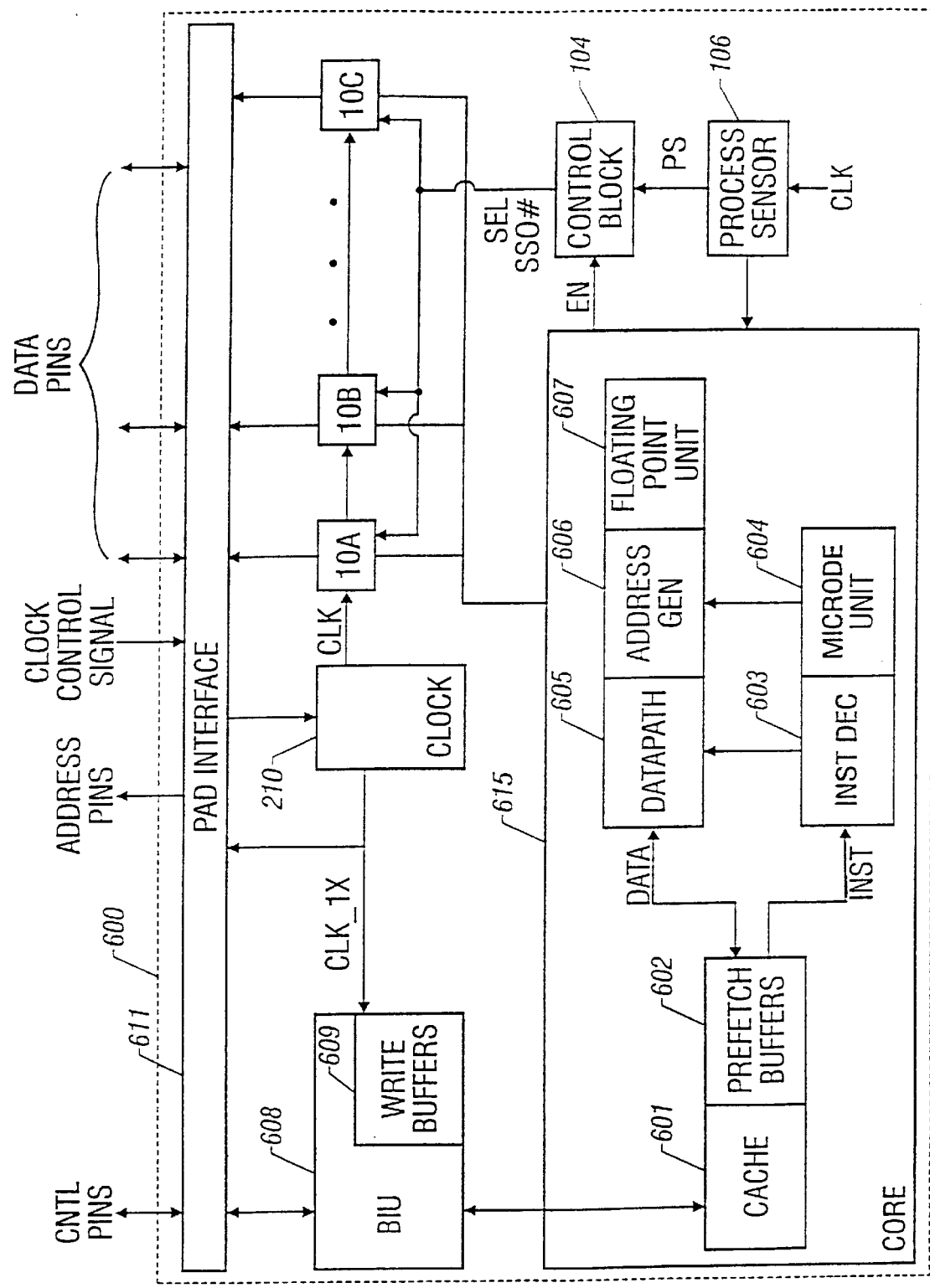
FIG. 7 is a block diagram of an electronic device.

As an electronic device typically includes multiple output signals, the circuitry 10 is repeated for each data output as illustrated in FIG. 7 (which shows circuits 10A, 10B, and 10C).

Figure 2A:
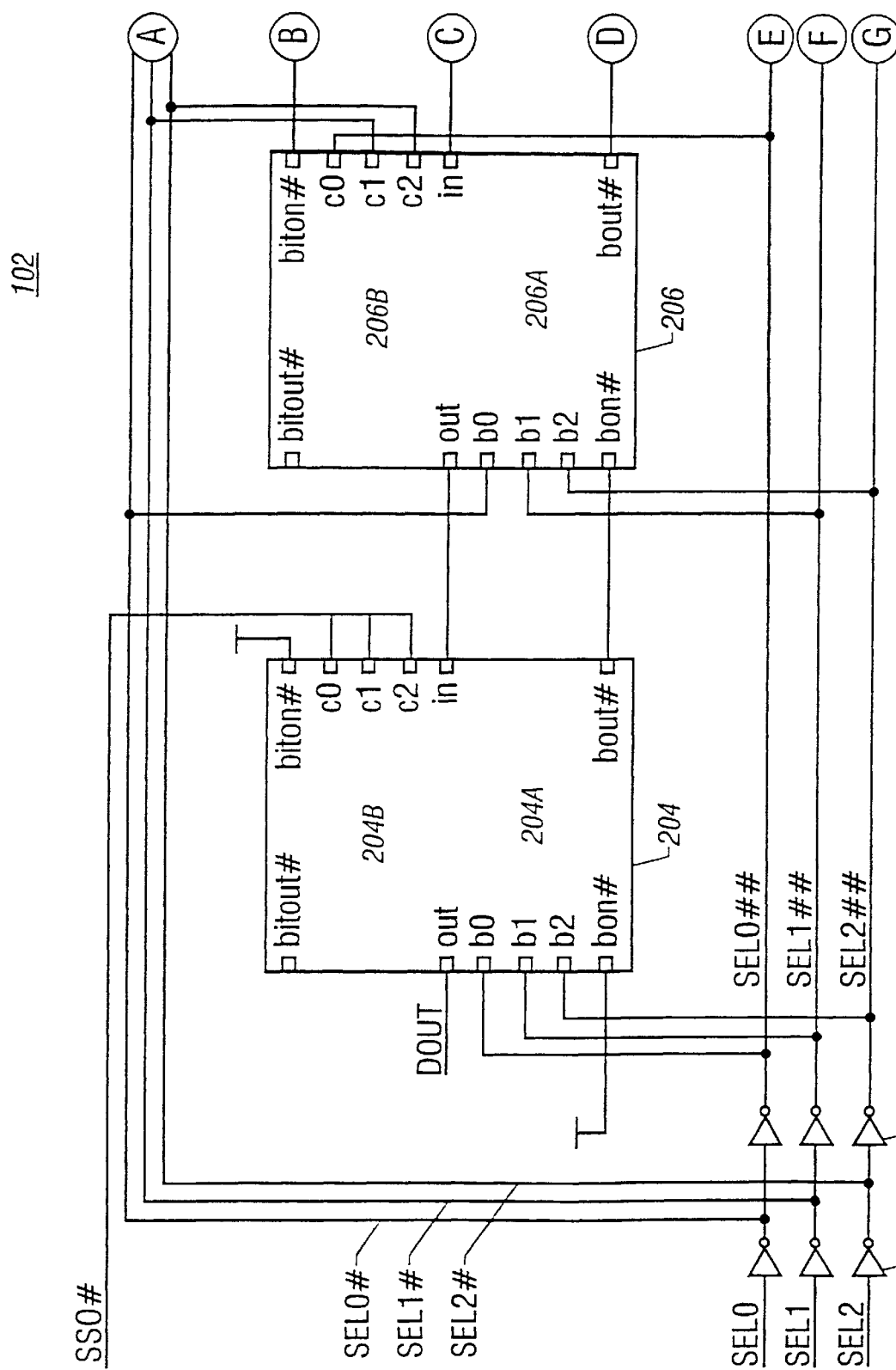
FIG. 2A–2B are a block diagram of a variable delay line circuit in the signal output circuit.
Figure 2B:
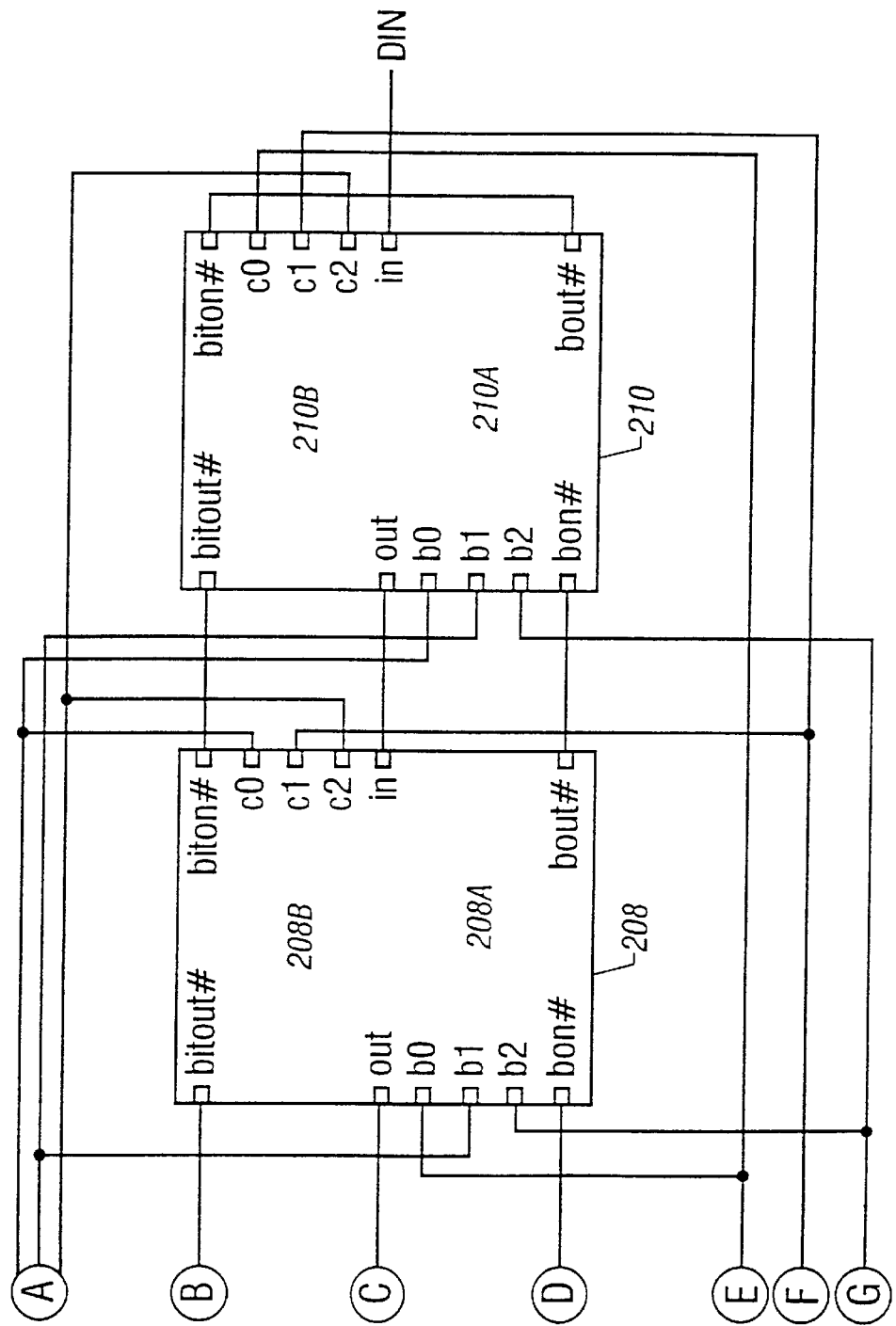
Figure 3:
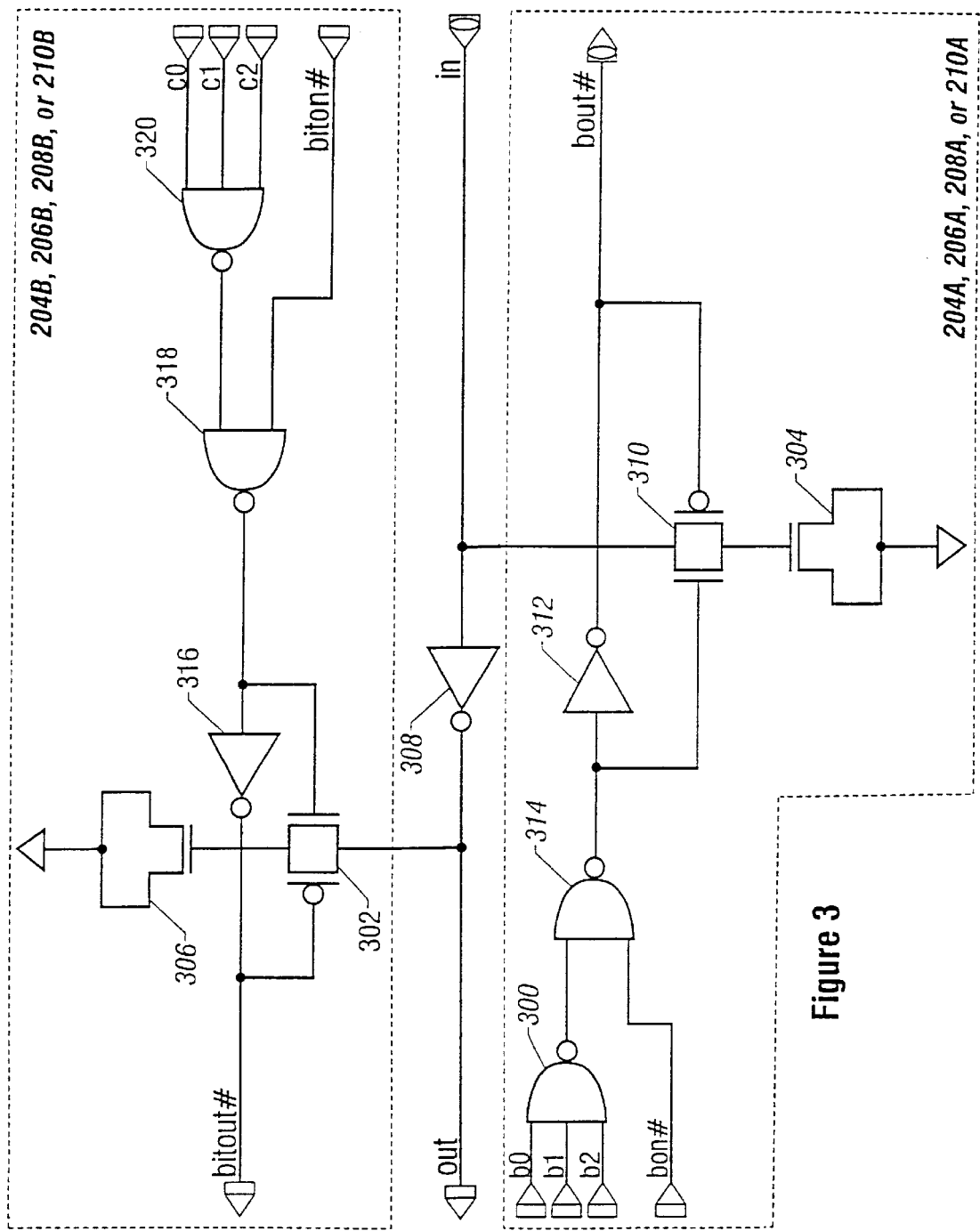
FIG. 3 is a logic diagram of a delay cell in the variable delay line circuit.

Referring to FIGS. 2A–2B, the variable delay line circuit 102 in one embodiment includes multiple delay cells, four in the embodiment shown. The delay cells 204, 206, 208, and 210 are identical in structure, and are shown in FIG. 3. As explained below, each of the delay cells 204, 206, 208, and 210 includes two corresponding capacitive loads 204A, 204B; 206A, 206B; 208A, 208B; and 210A, 120B.

The signals SEL[2:0] from the control block 104 are passed through two sets of inverters 200 and 202 to program which, if any, of the delay cells 204–210 are activated to provide additional delay between the input (DIN) and the output (DOUT) of the circuit 102. The first set of inverters 200 provides output signals SEL[2:0]#, and the second set of inverters 202 provides output signals SEL[2:0]##.

In this embodiment, each of the delay cells 204, 206, 208 and 210 actually provides two delay loads (A delay load and B delay load) to reduce the routing and amount of logic required between DIN and DOUT of the variable delay line circuit 102. Each delay cell can be activated either by the control block 104 (using the SEL[2:0] signals) or by another delay cell through the BON# or BITON# inputs. In each delay cell, the A delay load (204A, 206A, 208A, or 210A) is activated by either its BON# input being activated low or inputs B0, B1 and B2 all activated high. The B delay load (204B, 206B, 208B, or 210B) in each delay cell is activated by either the input BITON# being activated low or all of inputs C0, C1 and C2 activated high. The data input DIN is routed to the input port of the delay cell 210 while the data output DOUT is provided by the output port of the delay cell 204.

Inputs B0, B1, B2, C0, C1, and C2 of each delay cell receive different combinations of select signals SEL[2:0]##, as provided by the set of inverters 202, and inverted select signals SEL[2:0]# as provided by the set of inverters 200.

Referring further to FIG. 3, the A and B delay loads in each delay cell 204, 206, 208 or 210 are illustrated. Each of the A delay loads (204A, 206A, 208A, and 210A) provides an output BOUT#, and each of the B delay loads (204B, 206B, 208B, and 210B) provides an output BITOUT#.

As shown in FIGS. 2A and 2B, the A and B delay loads are serially connected in a chain, with the outputs BOUT# and BITOUT# from the A and B delay loads, respectively, being provided to the BON# or BITON# inputs of successive delay loads. In one configuration, the output BOUT# from the delay load 204A is connected to the BON# input of the delay load 206A; BOUT# from 206A is connected to BON# of 208A; and BOUT# from 208A is connected to BON# of 210A. The output BOUT# of the delay load 210A, is routed around to the BITON# input of the delay load 210B. Further, the output BITOUT# from the B delay load 210B is connected to the BITON# input of the B delay load 208B; and BITOUT# from 208B is connected to BITON# of 206B. Thus, the logical order of the delay loads starts at 204A (considered as the highest order delay load because it is activated by SEL[2:0] having the binary value 111), continues to 210A, wraps around to 210B, and continues back to end at 204B (considered as the lowest order delay load).

Connected in this manner, activation of one delay load causes all lower order delay loads to turn on. For example, if the highest order delay load 204A is activated, then all delay loads are activated to provide the maximum delay. If the delay load 208A is activated, then delay load 210A and all the B delay loads turn on.

The BON# input of the highest order delay load 204A is tied high so that the delay load can be activated only through its (B0, B1, B2) inputs, which are connected to receive (SEL0##, SEL1##, SEL2##). (SELn# has the inverted logical state of SELn, and SELn## has the inverted logical state of SELn#.) The following table shows to which input signals the (B0, B1, B2) and (C0, C1, C2) inputs of the delay cells 204, 206, 208, and 210 are connected.

|     | (B0, B1, B2)          | (C0, C1, C2)          |
| --- | --------------------- | --------------------- |
| 204 | SEL0##, SEL1##, SEL2## | SSO#, SSO#, SSO#     |
| 206 | SEL0#, SEL1##, SEL2##  | SEL0##, SEL1#, SEL2# |
| 208 | SEL0##, SEL1#, SEL2##  | SEL0#, SEL1##, SEL2# |
| 210 | SEL0#, SEL1#, SEL2##   | SEL0##, SEL1##, SEL2# |

The (C0, C1, C2) inputs of the delay cell 204 can be connected to receive (SEL0#, SEL1#, SEL2#), but is shown receiving (SSO#, SSO#, SSO#). The signal SSO#, activated low when multiple signal outputs are detected by the control block 104 to be switching at the same time, is described further below.

Referring again to FIG. 3, the path through which the data bit travels through each delay cell is through an inverter 308. The input and output of the inverter 308 is connectable to capacitive loads (the A and B delay loads) to increase the signal RC delay.

The A delay load in each cell includes a capacitive load 304, and the B delay load includes a capacitive load 306. The capacitive load 304 is connected to the data path (the input of the inverter 308) through a pass gate 310. The capacitive load 306 is connected to the data path (the output of the inverter 308) through a pass gate 302. Each of the capacitive loads 304 and 306 can include an N-channel MOSFET with its source and drain tied to a ground voltage (VSS).

The on/off state of the pass gate 310 is controlled by an inverter 312 and a NAND gate 314, and the pass gate 302 is controlled by an inverter 316 and a NAND gate 318. The output of the NAND gate 314 is connected to the input of the inverter 312 as well as to the gate of the N-channel transistor in the pass gate 310. The output of the inverter 312 is connected to the gate of the P-channel transistor in the pass gate 310. The pass gate 310 is turned on when the outputs of the gates 314 and 312 are high and low, respectively, and turned off when the outputs of the gates 314 and 312 are low and high, respectively.

Similarly, the pass gate 302 is turned on when the outputs of the gates 318 and 316 are high and low, respectively, and turned off when the outputs of the gates 318 and 316 are low and high, respectively.

One input of the two-input NAND gate 314 receives the output of a NAND gate 300, and the other input receives the input BON#. The inputs of the NAND gate 300 receive the B0, B1 and B2 inputs. When all inputs B0, B1, and B2 are high, the NAND gate 300 drives its output low, which causes the pass gate 310 to be activated. Alternatively, when the BON# input is activated low, the pass gate 310 is activated.

The inputs of the NAND gate 318 are connected to the output of a NAND gate 320 and to the input BITON#. The inputs of the NAND gate 320 receive inputs C0, C1, and C2. When C0, C1, and C2 are all activated high, or when the signal BITON# is activated low, the pass gate 302 is turned on to connect the capacitive load 306 to the data path.

The outputs of the inverters 312 and 316 also drive outputs BOUT# and BITOUT#, respectively. The signal BOUT# or BITOUT# is provided to the BON# or BITON# input of a lower order delay load.

By thus selectively activating delay loads in the data path from the output latch 100 to the output pad 112, a variable delay can be set to compensate for variances in voltage, temperature, and process.

The variable delay line circuit 102 adds additional delay from an edge of CLK to the output driver 110, which would affect the total delay from CLK to output valid. To reduce this total delay, the version of CLK used can be a clock that is shifted earlier compared to the main clock in the electronic device. By moving CLK earlier, the total delay is reduced.

The control block 104 receives output data bits DATA [M−1:0] generated by the electronic device, in which M can be different values, such as 16, 32, or 64. If many data bits are switching at the same time in the same direction, a significant current spike can occur on the power supply voltage lines of the electronic device. A significant current spike can affect the speed of the output drivers 110 in the electronic device. In addition, the outputted data bits may be sensed incorrectly by other devices.

To compensate for the possible reduced output driver speed, the control block detects if more than a predetermined number (e.g., half, three-quarters) of data output bits DATA [M−1:0] are switching. If so, the control block drives the signal SSO# low. As shown in the exemplary variable delay line circuit 102 in FIG. 2A, the signal SSO# is connected to the (C0, C1, C2) inputs of the delay cell 204. When the signal SSO# is grounded low, the delay cell 204 is disabled in the output circuits 10 of the electronic device to reduce added delay to data output switching.

If desired, other delay cells can be connected to receive SSO#, or alternatively, more delay cells can be added that are controlled by multiple SSO# bits. Where multiple SSO# bits would be particularly advantageous is for detecting a second number of bits switching at the same time. For example, if 80% of output bits are switching, then additional delay cells can be turned off to further reduce delays in data output switching.

By connecting SSO# to the delay cell 204, which is the last stage of the data path, sufficient time is provided for the control block to detect the multiple data switching condition, assert SSO#, and for the delay cell 204 to respond.

Figure 4A:
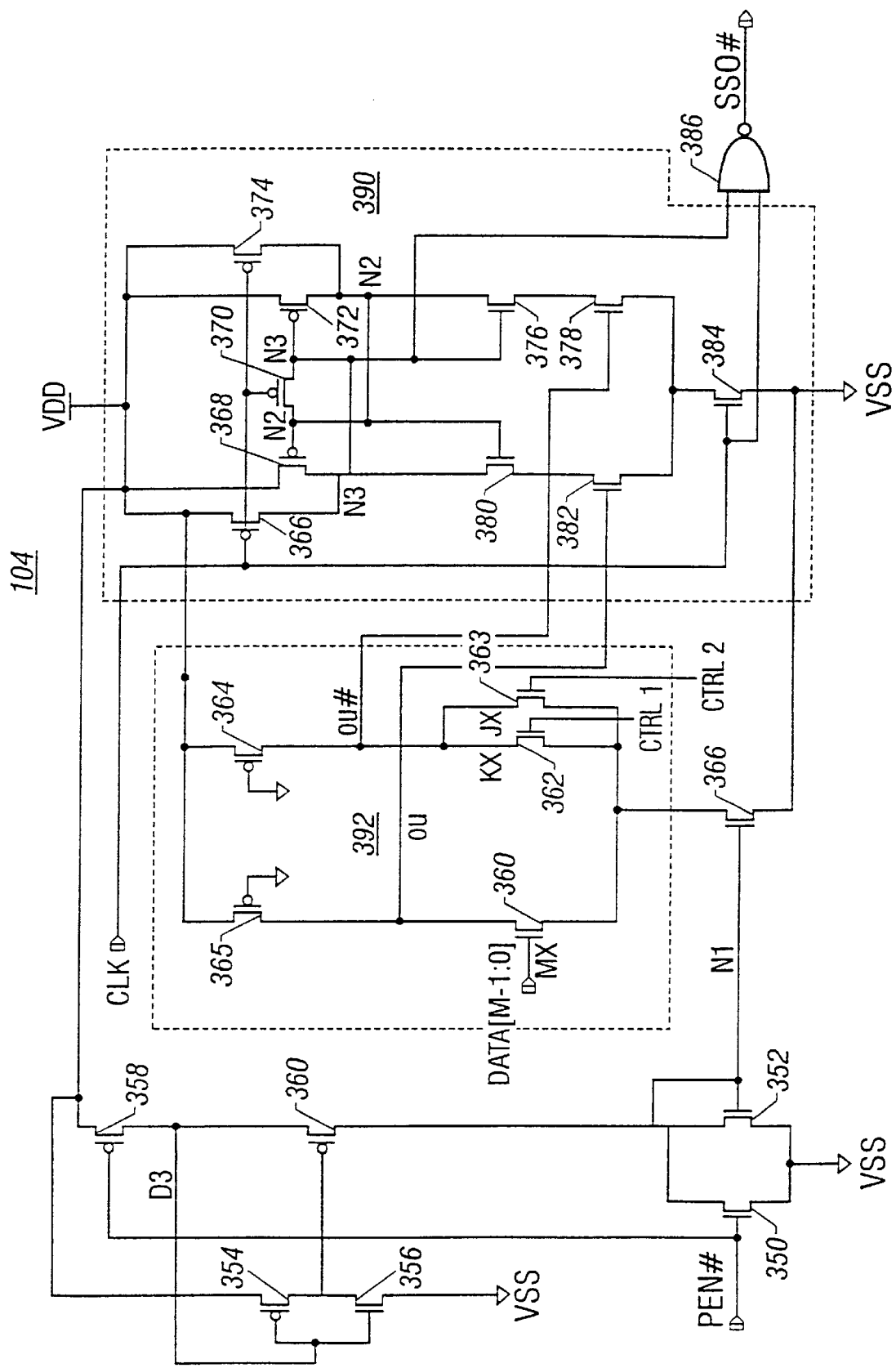
FIG. 4A and 4B are a logic diagram of a control block used with the signal output circuit.
Figure 4B:
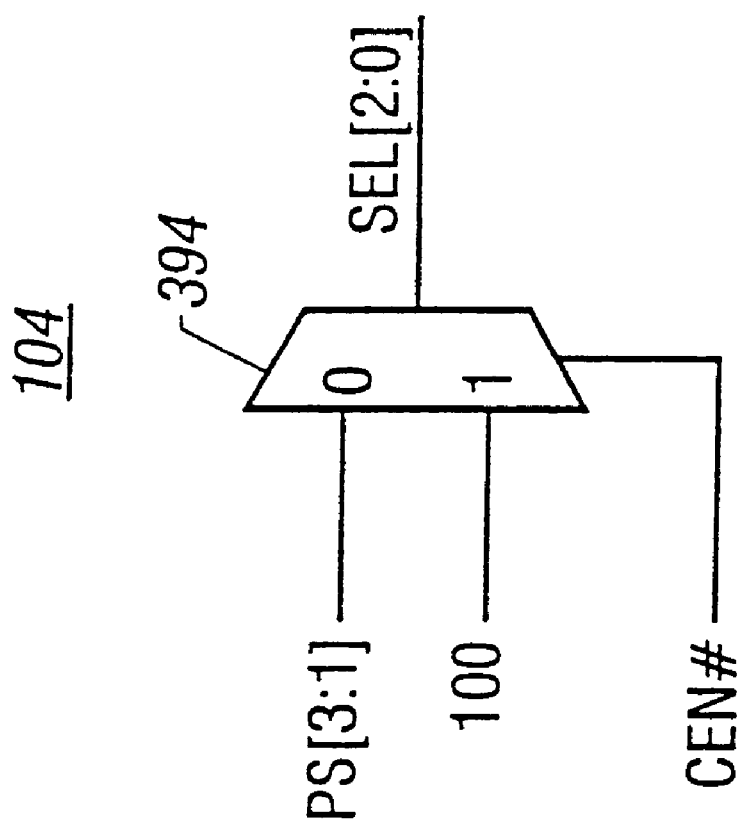

Referring to FIGS. 4A and 4B, circuitry in the control block 104 is shown. The control block 104 includes circuitry for generating the signal SSO# and circuitry for generating select signals SEL[2:0]. In one embodiment, the signals SEL[2:0] are provided by a multiplexer 394 that is selected by the enable signal CEN#. The "0" input of the multiplexer 394 receives signals PS[3:1], and the "1" input receives a binary value 100. Thus, when the control block is enabled (CEN# is low), the output bits SEL[2:0] have the same value as PS[3:1]. However, if the control block is disabled, then a default value of 100 is outputted to SEL[2:0].

The circuitry for generating the signal SSO# includes a differential amplifier 392 and a level shifter 390. The sense differential 392 receives data inputs DATA[M−1:0] at the gates of a first set of M (e.g., M is 16) N-channel MOSFETs 360 connected in parallel. Different numbers of transistors can be used. The differential amplifier 392 also includes a second set of K (e.g., K is 8) N-channel MOSFETs 362 connected in parallel that are activated by a signal CTRL1. The differential amplifier 392 also includes a third set of J (e.g., J is 4) N-channel MOSFETs 363 activated by a signal CTRL2. In one embodiment, J and K are selected to have values that are predetermined fractions of M.

The sources of the transistors 360, 362, and 364 are connected to a common node COM, which is connected to a ground voltage (VSS) through an N-channel MOSFET 366 when it is activated. The drains of the transistors 360 are connected to a differential amplifier node OU and the drains of the transistors 362 and 363 are connected to differential a amplifier nodes OU#. The nodes OU and OU# are connected to VDD through P-channel MOSFETs 364 and 365, respectively. The gates of the transistors 364 and 365 are tied low to keep them always on.

When the differential amplifier 392 is enabled (signal N1 to the gate of transistor 366 is activated high), the sets of transistors 360, 362, and 363 essentially act as a sensor to detect differences in current flow due to different numbers of the bits DATA[M−1:0] being at a high state. If the signal CTRL1 is active high, then detection of more than a first number (e.g., 8) of data output signals switching is performed. If the signals CTRL1 and CTRL2 are both active high, then detection of more than a second number (e.g., 12) of data output signals switching is performed. If more than the detected number of signals DATA[M−1:0] are at a high state (indicating that the corresponding data outputs are going to switch low), the node OU is at a lower voltage than the node OU#. However, if the reverse is true, then the node OU has a higher voltage than the node OU#.

The nodes OU and OU# from the differential amplifier 392 are connected to the gates of N-channel MOSFETs 382 and 378, respectively, in the level shifter 390. The sources of transistors 382 and 378 are connected commonly to the drain of a transistor 384, whose source is connected to VSS and whose gate receives the clock CLK. The level shifter 390 also includes N-channel MOSFETs 380 and 376 connected in series with the transistors 382 and 378, respectively. The gate and source of the transistor 380 are connected to nodes N2 and N3, respectively, and the gate and source of the transistor 376 are connected to nodes N3 and N2, respectively.

The nodes N2 and N3 are also connected to the gates of P-channel MOSFETs 368 and 272, respectively. The drains of the transistors 368 and 372 are tied to VDD, while the sources of the transistors 368 and 372 are connected to nodes N3 and N2, respectively. A P-channel MOSFET 370 is connected between nodes N2 and N3 with its gate connected to CLK. In addition, two P-channel MOSFETs 366 and 374, whose gates are also controlled by the clock CLK, are connected between VDD and nodes N3 and N2, respectively.

If the node OU has a lower voltage than the node OU#, the node N3 is pulled high while the node N2 is pulled low by the level shifter 390. When the node N3 is high, and the clock CLK is active high, then a NAND gate 386 drives the signal SSO# low. However, if the node OU has a voltage that is higher than or equal to node OU#, then the node N3 is pulled low while the node N2 is pulled high, which causes the NAND gate 386 to deactivate SSO# high.

The differential amplifier 392 is enabled by circuitry that drives node N1 high. Node N1 is connected to the drains of N-channel MOSFETs 350 and 352, whose sources are connected to VSS. The gate of transistor 352 is connected to the enable signal PEN#, while the gate of the transistor 352 is tied to N1. The enable signal PEN# is also provided to the gate of a P-channel MOSFET 358.

When the signal PEN# is deactivated high, the transistor 350 is on while the transistor 358 is off, thereby pulling the node N1 to VSS. When the signal PEN# is activated low, the transistor 358 turns on to drive node D3 high, which in turn causes the inverter formed by transistors 354 and 356 to drive the gate of a P-channel MOSFET 360 low, thereby turning it on. As a result, the node N1 is pulled high through transistors 358 and 360 to activate the transistor 366.

Figure 5:
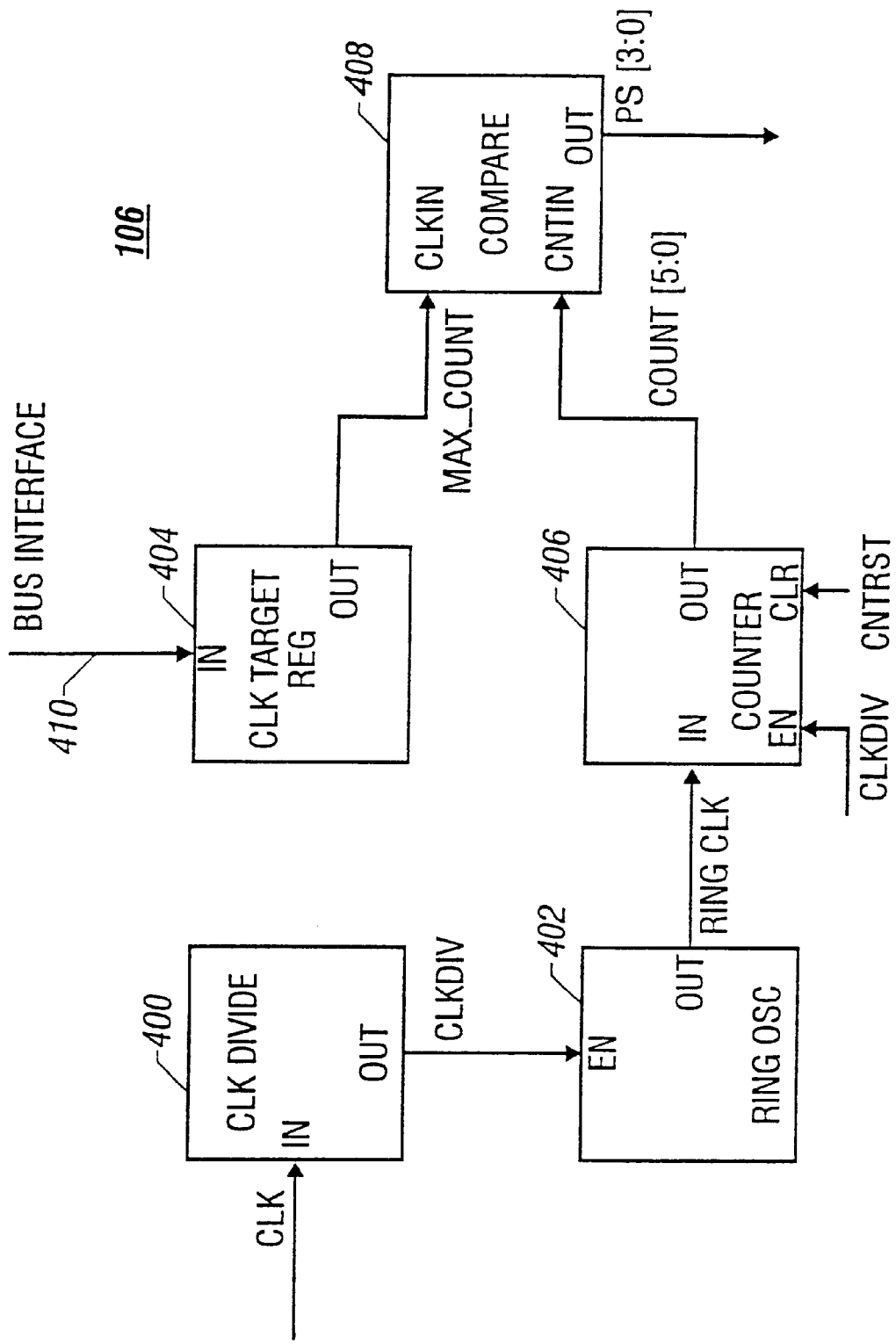
FIG. 5 is a block diagram of a process sensor.

Referring to FIG. 5, the process sensor 106 includes a clock divider 400 and a ring oscillator 402. The clock divider 400 receives the device clock CLK and generates a clock pulse CLKDIV once every predetermined number (e.g., 100) of CLK cycles. The pulse CLKDIV, when high, enables the ring oscillator 402. The CLKDIV signal pulse high period is the same as the CLK pulse high period and thus has a known value. By pulsing the CLKDIV once out of every predetermined number of CLK clocks, power consumption due to activation of the process sensor 106 is reduced while still allowing periodic monitoring of the conditions of the electronic device.

While the signal CLKDIV is high, the ring oscillator 402 is allowed to cycle to produce a sequence of clocks RINGCLK. The number of RINGCLK clocks depends on the frequency of the ring oscillator 402, which in turn depends on the current voltage, temperature, and process conditions of the electronic device. The ring oscillator 402 cycles faster under fast conditions and slower in slow conditions. The ring oscillator 402 is designed to be sensitive to variations in process conditions, temperature, and voltage.

The number of RINGCLK clocks produced by the ring oscillator 402 are counted by a counter 406, which can have 6 bits. The counter 406 is enabled while CLKDIV is high. The value stored by the counter 406 represents the condition (fast, slow, or intermediate) of the electronic device. The counter 406 can be cleared by activating CNTRST.

A clock target register 404 stores a value MAX_COUNT that represents the maximum count value that can be reached at a given CLK period under the fastest expected conditions. During start-up of the electronic device, the clock target register 404 is loaded from a bus interface 410, e.g., a serial bus.

The count period is the period when CLKDIV is high. After each count period (i.e., CLKDIV transitions from high back to low), a comparator 408 subtracts the value on bits COUNT[5:0] produced by the counter 406 from the value MAX$_{13}$ COUNT. The comparator 408 produces a value PS that is the difference between COUNT and MAX_COUNT. Any number of PS bits can be used, with the embodiment of FIG. 4 having four bits PS[3:0].

Figure 6:
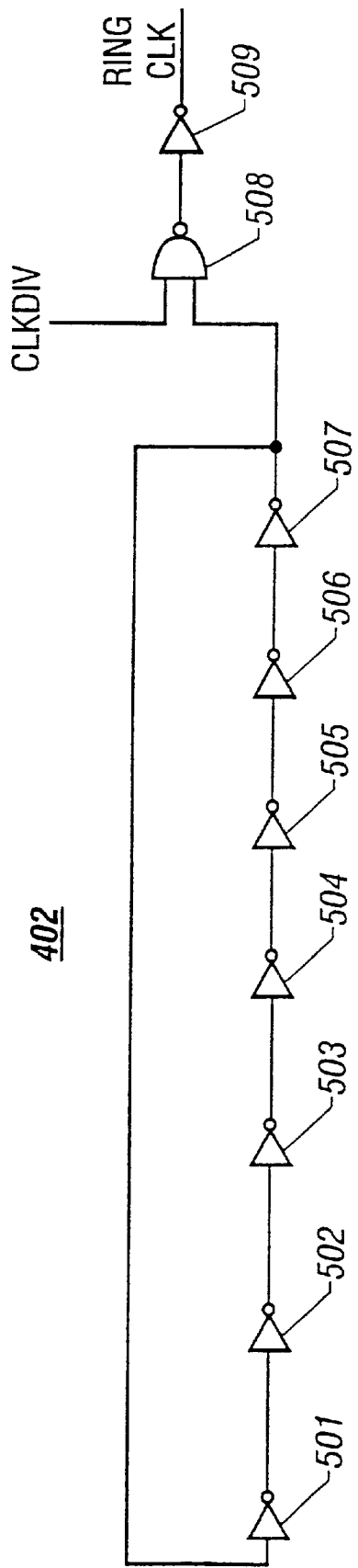
FIG. 6 is a logic diagram of an oscillator in the process sensor.

Referring to FIG. 6, the ring oscillator 402 contains seven serially-connected inverters 501, 502, 503, 504, 506, and 507. The output of the last inverter 507 is fed back to the input of the first inverter 501, thereby providing an odd number of inverters connected in a loop to enable oscillation. The frequency of oscillation of the ring oscillator 402 depends on factors such as process conditions, voltage, and temperature. The widths and lengths of the P-channel MOSFETs and the widths and lengths of the N-channel MOSFETS in each of the inverters 501–507 are set to predetermined ratios to achieve greatest sensitivity to the factors set forth above.

The output of the last inverter 507 is connected to one input of a NAND gate 508, whose other input is connected to receive CLKDIV. The output of the NAND gate 508 is connected to the input of an inverter 509, which drives the signal RINGCLK. Thus, the signal RINGCLK is allowed to toggle only when CLKDIV is active high.

In addition to providing the value of PS[3:0] to the control block 104 that controls a variable delay line circuit 102 (to program the delay from the data output latch 100 to the output driver 110) and to the predriver 108 (to program the slew rate of the output driver 110), the values PS[3:0] generated by the process sensor 106 can be provided to other circuits in the electronic device to compensate for variations in circuit speed due to variations in temperature, voltage, and process conditions. One such example is an adjustable clock delay path for deskewing a clock on the device if no PLLs are located on the device.

By including the process sensor on chip, no extra external pins to the electronic device are needed. Further, the process sensor is continuous during device operation and consumes little power. Accurate speed compensation can be provided throughout the device.

Referring to FIG. 7, the signal output circuitry 10 and process sensor 106 can be used to monitor temperature in many different types of electronic devices, including a microprocessor 600. The output signals from the process sensor 106 can be routed to numerous circuitry throughout the device where compensation for variations in temperature, voltage, and process is required.

The microprocessor 600 includes various output signal pins, including control, address, and data pins. The output circuitry 10 described can be used with any of the output pins. However, in the embodiment shown, the output circuitry 10 is used to control the delay path between a clock edge and switching of the data output buffers that drive the data pins.

The microprocessor 600 further includes a processing core 615 that processes data of a computer system 8. The core 615 includes a cache 601, prefetch buffers 602, an instruction decoder 603, a microcode unit 604, datapath circuitry 605, an address generator 606 and a floating point unit 607. The cache 601 stores instructions and data for execution by the microprocessor 600. The prefetch buffers 602 retrieve data and instructions for execution by the microprocessor 600. The buffers 602 retrieves the data and instructions either from the cache 601 or if a cache miss occurs, from a memory of the computer system via a bus interface unit 608.

The datapath circuitry 605 provides the main execution data path for the microprocessor 600. The datapath circuitry 605 includes an arithmetic logic unit (ALU), control registers, a barrel shifter, read only memory (ROM) and flags. The datapath circuitry 605 retrieves data from the prefetch buffers 602. The datapath circuitry 605 executes microcode provided by the instruction decoder 603 using data received from the prefetch buffers 602 according to the addresses generated by the address generator 606. The floating point unit 607 is used in the execution of floating point instructions.

Outside of the processing core 615, the microprocessor 600 has the bus interface unit 608, a pad interface 611, and a clock generator 610. The bus interface unit 608 provides an interface between internal buses of the microprocessor 600 and external buses that are used to fetch data and instructions from a memory of the computer system. The bus interface 608 has write buffers 609 that are used to stores data to be transferred from the microprocessor 600 to the rest of the computer system. The pad interface 611 provides a pin interface for control, address and data signals passed between the microprocessor 600 and the rest of the computer system. A clock generator 610 generates clock signals for the microprocessor 600.

Other embodiments are also within the scope of the following claims. For example, other types of predrivers and output drivers can be used. The predriver can also be eliminated. Other types of delay cells in the variable delay line circuit can be used, such as a delay cell with only one capacitive load or a delay cell with more than two capacitive loads that can be selectively enabled. The electronic device can include an integrated circuit device as well as larger systems, such as computer system.

Although the present invention has been described with reference to specific exemplary embodiments, various modifications and variations may be made to these embodiments without departing from the spirit and scope of the invention as set forth in the claims.

What is claimed is:

1. A circuit for determining if more than a predetermined number of data output bits are switching, the circuit comprising:

a sensor to receive the data output bits, each data output bit capable of being at a first state or a second state, the sensor to provide an output that is controlled by the data output bits being at the first and second states; and a comparator to detect a state of the sensor output corresponding to more than the predetermined number of the data output bits being at the first state and to output an indication that more than the predetermined number of data output bits are at the first state, the predetermined number greater than one.

2. The circuit of claim 1, wherein the sensor comprises a first set of transistors to receive corresponding data output bits, each data output bit controlling a state of a corresponding transistor.

3. The circuit of claim 2, wherein the sensor further comprises a second set of transistors, wherein source nodes of the first set of transistors and second set of transistors are all tied to a common node.

4. The circuit of claim 2, wherein the sensor further comprises a second set of transistors having gates tied to a control signal that if activated causes the second set of transistors to turn on, the second set of transistors to provide a reference for the first set of transistors.

5. The circuit of claim 4, wherein a number of the second set of transistors determines the predetermined number.

6. A circuit for determining if more than a predetermined number of data output bits are switching, the circuit comprising:
   a sensor receiving the data output bits, each data output bit capable of being at a first state or a second state, the sensor providing an output that is controlled by the data output bits being at the first and second states; and
   a comparator configured to detect a state of the sensor output corresponding to more than the predetermined number of the data output bits being at the first state and to output an indication that more than the predetermined number of data output bits are at the first state,
   wherein the sensor includes a differential amplifier having a first set of transistors receiving corresponding data output bits, a data output bit controlling whether a corresponding transistor is turned on.

7. The circuit of claim 6, wherein the transistors are connected in parallel.

8. The circuit of claim 6, wherein the differential amplifier further includes a second set of transistors that are on, the differential amplifier outputting a value depending on the number of the first set of transistors being on in relation to the second set of transistors.

9. A circuit to detect states of a plurality of signals, comprising:
   a sensor device to receive the plurality of signals, the sensor device to produce a first indication if a first number or more of the signals are at a predetermined state, the first number being greater than one, the sensor device to provide a second indication if less than the first number of the signals are at the predetermined state.

10. The circuit of claim 9, further comprising one other device to receive the first and second indications, the one other device to determine if the first number or more of the signals are switching based on the first and second indications.

11. The circuit of claim 10, wherein the first and second indications comprise a first state and a second state of an output signal.

12. The circuit of claim 9, wherein the sensor device comprises a first set of transistors each to receive a corresponding one of the signals, a state of each signal to determine a state of a corresponding transistor.

13. The circuit of claim 12, wherein the sensor device further comprises a second set of transistors to provide a reference for the first set of transistors, a number of the second set of transistors to determine the first number.

14. The circuit of claim 13, wherein a first portion of the second set of transistors are controlled by a first control signal and a second portion of the second set of transistors are controlled by a second control signal.

15. The circuit of claim 14, wherein the first and second control signals are selectively activable to vary the first number.

16. A circuit to detect states of a plurality of signals, comprising:
   a sensor device coupled to the plurality of signals, the sensor device producing a first indication if a first number or more of the signals are at a predetermined state, the sensor device producing a second indication if less than the first number of the signals are at the predetermined state,
   wherein the sensor device includes a differential amplifier having a first set of transistors controlled by the plurality of signals and a second set of transistors, the second set having a predetermined number of transistors to provide detection of the first number or more of the signals being at the predetermined state.

17. The circuit of claim 16, wherein the predetermined number of transistors in the second set is equal to the first number.

18. The circuit of claim 16, wherein the differential amplifier further includes a third set of transistors, the second and third set of transistors being selectively activable to vary the first number.

19. The circuit of claim 16, wherein the differential amplifier generates an output signal to provide the first or second indication.

20. The circuit of claim 19, wherein the differential amplifier further includes a second output signal, the circuit further comprising a comparator to compare the states of the first and second output signals.

21. A method of detecting states of a plurality of signals, comprising:
   determining if a first number or more of the signals are at a first state;
   generating a first indication if the first number or more of the signals are at the first state, the first number being greater than one; and
   generating a second indication if less than the first number of the signals are at the first state.

22. The method of claim 21, further comprising detecting that the first number or more of the signals are switching based on the first indication.

23. A method of detecting states of a plurality of signals, comprising:
   determining if a first number or more of the signals are at a first state;
   generating a first indication if the first number or more of the signals are at the first state; and
   generating a second indication if less than the first number of the signals are at the first state,
   wherein the determining includes connecting the signals to a first set of transistors, providing a second set of transistors, and comparing outputs of the first and second sets of transistors.

24. The method of claim 23, wherein the determining further includes varying the number of transistors in the second set.

25. The method of claim 23, wherein connecting the signals to the first set of transistors includes connecting the signals to gates of the first set of transistors, the first set of transistors being arranged in parallel.

26. The method of claim 23, wherein providing the second set of transistors includes arranging the second set of transistors in parallel.

27. The method of claim 23, further comprising controlling a first portion of the second set of transistors with a first control signal and controlling a second portion of the second set of transistors with a second control signal.

28. The method of claim 27, further comprising selectively activating one of or both of the first and second control signals to vary the first number.

* * * * *